US005761242A

United States Patent [19]

Thomas

[11] Patent Number: 5,761,242

[45] Date of Patent: Jun. 2, 1998

[54] SYSTEM FOR THE MEASUREMENT OF SONET NETWORK SYNCHRONIZATION QUALITY

[75] Inventor: Leonard Charles Thomas, Newark, Calif.

[73] Assignee: Sprint Communications Co. L.P., Kansas City, Mo.

[21] Appl. No.: 489,643

[22] Filed: Jun. 12, 1995

[51] Int. Cl.[6] .......... H04L 7/04

[52] U.S. Cl. .......... 375/226; 375/368; 375/369; 375/373; 370/516

[58] Field of Search .......... 375/354, 356, 375/366, 368, 369, 372, 226; 370/304, 305, 503, 516

[56] References Cited

U.S. PATENT DOCUMENTS

| | | | |
|---|---|---|---|
| 4,835,768 | 5/1989 | Hubbard et al. | 370/512 |
| 5,052,025 | 9/1991 | Duff et al. | 375/262 |
| 5,113,417 | 5/1992 | McNesby | 375/368 |
| 5,132,991 | 7/1992 | McNesby et al. | 375/368 |

*Primary Examiner*—Young T. Tse

*Attorney, Agent, or Firm*—Harley R. Ball; Jeo W. Caven

[57] ABSTRACT

The invention provides a system for measuring the synchronization of SONET signals. The invention counts the bits in an STS-1 signal starting at a reference time point and ending when the framing bytes A1 and A2 are detected. The counts are repeated every other SONET frame. The system can be applied to multiple SONET signals arriving at a location. The system can employ a CPU to analyze the bit counts to determine if the timing of a SONET signal begins to experience wander.

21 Claims, 4 Drawing Sheets

SYSTEM FOR THE MEASUREMENT OF SONET NETWORK SYNCHRONIZATION QUALITY

BACKGROUND

1. Field of the Invention

The invention relates to telecommunications, and in particular, to a system for monitoring the relative timing of different SONET signals with respect to a timing reference.

2. Description of the Prior Art

Synchronous Optical Network (SONET) systems are currently being deployed. SONET is based on the synchronous transmission of information. SONET systems are based on the OC-1 optical signal, or its electrical counterpart, the STS-1 signal. The STS-1 signal is comprised of 6,480 bit data frames transmitted at the rate of 8,000 frames per second. The first two bytes in each frame are designated as A1 and A2. The A1 and A2 bytes form a framing pattern of bits that is recognized by the SONET system as the start of a frame. In other words, the A1 and A2 bytes are placed at the beginning of each frame.

SONET frames are timed at the rate of 8,000 frames per second using synchronized clocks at the various transmission points in the network. Although the clocks may be derived from a common source, the clocks at various points can still vary. The problem is even greater when considering that the clocks may reside in completely different networks, such as long distance carriers, local exchange carriers, alternate access providers, or private networks. For example, a long distance carrier may accept SONET OC-1 signals from three separate local carriers and transmit these three local carrier signals in a single SONET OC-3 signal in the long distance network. Ideally, the clocks of each local carrier and the long distance carrier would remain perfectly synchronized with the international reference clock, and the frames from each source would consistently arrive at their respective time reference points.

Frame rates can experience timing variations known as wander or jitter. This means that the frames are arriving later or earlier than expected. Wander has been defined as timing rate variation that occurs over periods greater than 0.1 second and jitter has been defined as a timing rate variation that occurs over periods less than 0.1 second. Networks are interested in frame rate variation in order to indicate inaccuracies in the clocks and avoid SONET pointer adjustments. It is important that a network be able to detect wander and jitter which may indicate clock inaccuracies. In the above example, the long distance carrier is interested in detecting wander and jitter in the three arriving local carrier signals. The network must also maintain the integrity of its own clock. At present, a system is needed that can detect and monitor the timing performance of various SONET signals.

SUMMARY

The invention provides a system for measuring the synchronization of a SONET signal. It comprises a SONET interface that receives the SONET signal and detects the framing bytes in the SONET signal. It also comprises a means for generating a start signal and a reset signal at a predetermined frequency, based on a precision timing reference. The invention also comprises a means coupled to the generator means and to the SONET interface for counting the number of bits in the SONET signal after each start signal is generated and until the SONET framing bytes are detected, and for resetting the counts after each reset signal is generated.

The invention may also include a CPU configured to detect variations in the counts representative of frame rate variations in the SONET signal. This would also require a means for providing the counts to the CPU. The CPU could be configured to generate an alarm when a particular variation in the counts reaches a predetermined number of bits. The invention also comprises a method for measuring the synchronization of a SONET signal. The method comprises receiving a SONET signal. It also includes generating a start signal and a reset signal at a predetermined frequency, based on a precision timing reference. The method further includes detecting the framing bytes in the SONET signal and counting the number of bits in the SONET signal after the start signal is generated and until the SONET framing bytes are detected. The method further includes resetting the count after each reset signal is generated. The method may also include providing the counts to a CPU detecting variations in the counts representative of frame rate variations in the SONET signal. Long term wander, in terms of bits per day or bits per week, can be determined by recording and analyzing the variations in the number of STS-1 bits between the reference start signal and the detected Sonet frame byte over the desired time period.

BRIEF DESCRIPTION OF THE DRAWING

These and other aspects of the invention can be better understood with reference to the following drawings where.

DESCRIPTION

Figure 1:
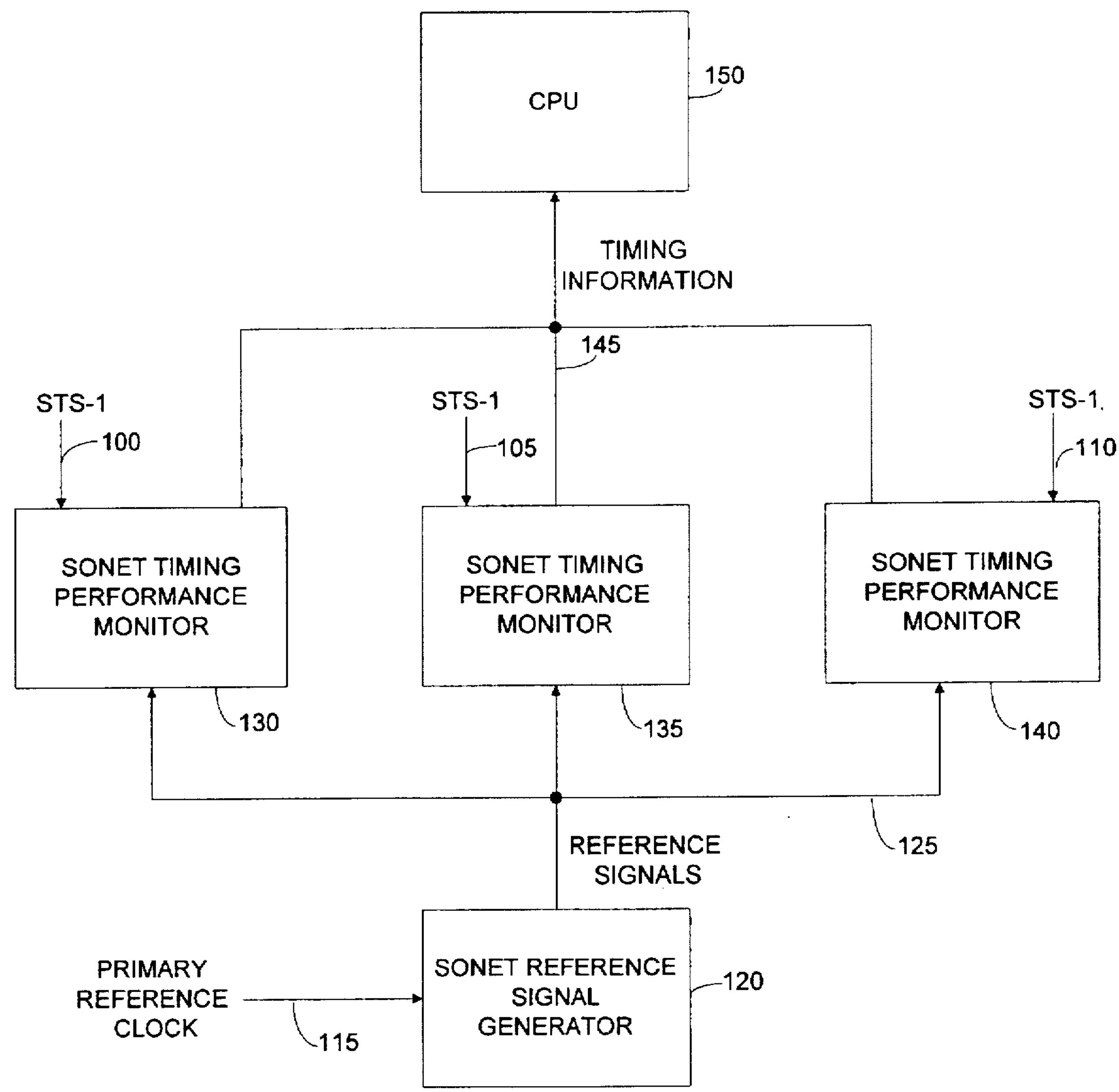
FIG. 1 shows a block diagram of a version of the invention.

The invention is a system for detecting and monitoring the timing performance of various SONET signals relative to each other and to a precision reference clock. FIG. 1 depicts a block diagram representing a version of the present invention. STS-1 signals 100, 105, and 110 are provided to SONET timing performance monitors 130, 135, and 140 respectively. These monitors also receive reference signals 125 from SONET reference signal generator 120. SONET reference signal generator 120 receives primary reference clock signal 115. SONET timing performances monitors 130, 135, and 140 each provide timing information 145 to CPU 150.

STS-1 signals 100, 105, and 110 are shown. As is known, STS-1 signals are SONET signals in electrical format as opposed to optical. Signals 100, 105, and 110 are derived from the received signals which are to be measured. For example, the received signal may be an OC-3. An optical splitter could be used to derive a test portion of the signal for timing measurement while leaving a portion of the signal for standard network processing. The test portion would be used to derive a single STS-1 signal. Since SONET signals are byte interleaved, only one STS-1 signal is needed to determine the timing of all component signals in the arriving SONET signal. For example, only a single STS-1 signal would be derived from a single OC-48 signal. Those skilled in the art are readily familiar with techniques for properly deriving the STS-1 signals for testing.

Also shown is primary reference clock signal 115. This signal could be any precision 1,544,000 bit per second signal and has a preferred accuracy equal to or greater than one part in ten to the 11th power. Those skilled in the art are aware of the T1 Primary Reference Source (PRS) which is traceable to the international time standard in Paris, France. The PRS can provide the precision 1,544,000 bit per second signal represented by clock signal 115. Clock signal 115 is provided to SONET reference signal generator 120. Reference signal generator 120 is circuitry which uses clock signal 115 to produce reference signals 125.

Also shown are SONET timing performance monitors 130, 135, and 140. Each timing performance monitor receives a duplicate set of reference signals 125 from reference signal generator 120. In addition, timing performance monitors 130, 135, and 140 each receive a separate STS-1 signal. Each timing performance monitor represents circuitry which detects the timing performance of its STS-1 signal using the reference signals. In that regard, each timing performance monitor produces timing information 145 which is provided to central processing unit (CPU) 150.

More specifically, a timing performance monitor counts the number of bits (clock cycles) in an STS-1 signal. The timing performance monitor begins the count when a reference signal is received and ends the count when framing bytes A1 and A2 are detected. In essence, the timing performance monitor counts the number of bits between the reference signal and the next SONET frame. The reference signal is provided to the timing performance monitor 4000 times per second and a new count is made after each reference signal. Since the SONET frame rate is 8,000 frames per second, the bits are counted for every other frame. These counts comprise timing information 145 which is provided to CPU 150. While the SONET frame rate is 8,000 frames per second, measurements are made only 4,000 times per second. This time allocation is designed to allow the first 125 microseconds for calculating timing information 145, and the next 125 microseconds for moving timing information 145 to a buffer for transfer to CPU 150. Since the system is designed to measure wander, timing information 145 would be moved to CPU 150 ten times per second. It could be moved more infrequently, such as once per minute. More frequent transfer of timing information 145 could be caused by alarms or special testing needs.

CPU 150 is capable of processing timing information 145 to detect if any of the STS-1 signals experience timing variations, or if clock signal 115 is in error. This is accomplished by tracking the bit counts of timing information 145. If the bit count of a signal begins to change, that indicates that the clock for that signal is inaccurate. If all signals experience similar bit changes, that indicates that clock signal 115 is probably inaccurate. CPU 150 could be a standard personal computer programmed in accord with the invention. The output of CPU 150 could be in the form of Time Interval Error (TIE) data as defined in ANSI standard T1 101-1994. The TE data from multiple SONET timing performance circuits would be plotted on a common time axis using color display terminals for rapid data analysis. In addition, CPU 150 would continuously perform calculations on the timing information 145 to determine if the timing of any signals had crossed pre-determined alarm thresholds. If so, CPU 150 could issue alarm messages to network operations.

Figure 2:
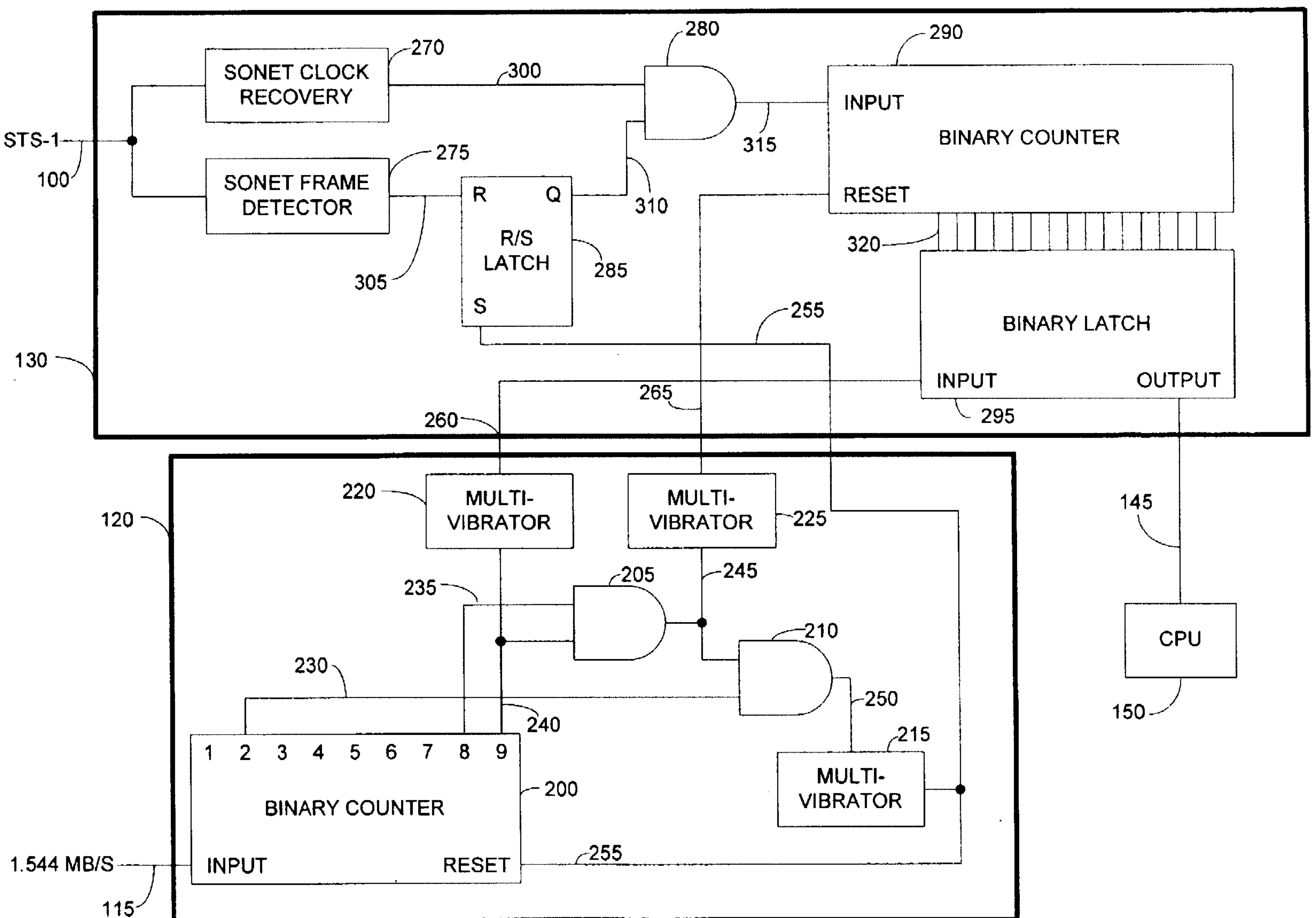
FIG. 2 shows a schematic diagram of a version of the invention.

FIG. 2 depicts a schematic view of a version of the invention. In FIG. 2, STS-1 100, clock signal 115, timing information 145, and CPU 150 are again shown. In addition, reference signal generator 120 and timing performance monitor 130 are again shown, but in greater detail. It should be understood that the circuitry shown on FIG. 2 for timing performance 130 would be duplicated for each timing performance monitor shown on FIG. 1, or as required to monitor the desired SONET systems at a given location. Additionally, it should be noted that FIG. 2 depicts connections which carry various signals. These types of connections are known in the art. The signals are typically at a "1" state or at a "0" state. Below, reference is made to the signal and its current state, although the state of the signal can change. The underlying connections need not be discussed in further detail and are not referenced.

Reference signal generator 120 is comprised of binary counter 200, AND gate 205, AND gate 210, multi-vibrator 215, multi-vibrator 220, and multi-vibrator 225, as well as, the following signals. Clock signal 115 is provided to the input of binary counter 200. Pins 8 and 9 of binary counter 200 respectively provide signals 235 and 240 to gate 205. Pin 2 of binary counter 200 provides signal 230 to gate 210. Gate 205 provides signal 245 to gate 210. Gate 210 provides signal 250 to multi-vibrator 215. Multi-vibrator 215 shapes and provides signal 255 to the reset of binary counter 200. Signal 255 represents a count of exactly two DS1 frames.

Figure 3:
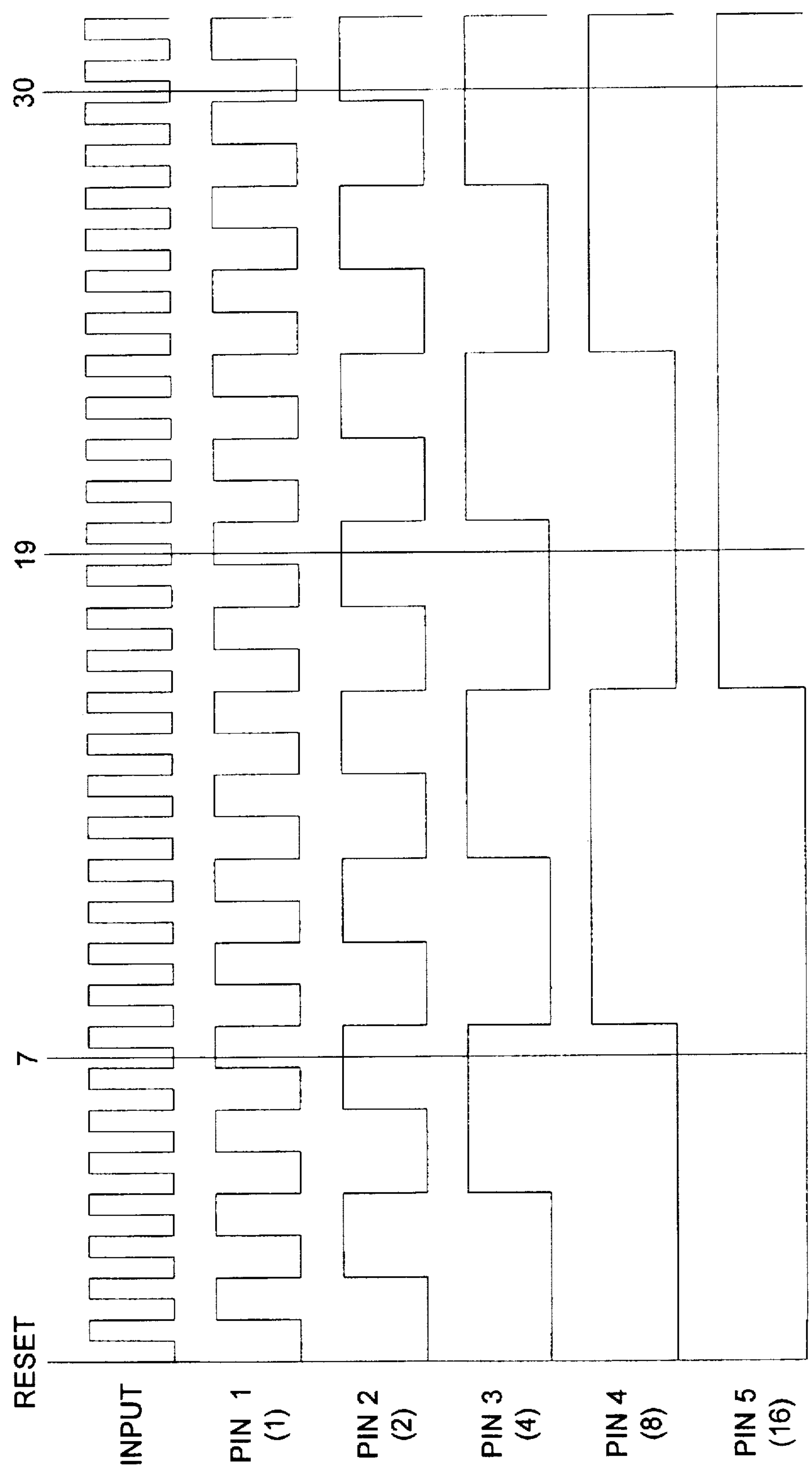
FIG. 3 shows a timing diagram of a version of the invention.

Binary counter 200 is an integrated circuit which counts the number of bits in its input signal and provides various signals based on different divisions of the input. FIG. 3 depicts the input and some of the output signals of binary counter 200. Binary counter 200 divides the input signal and provides the resulting signals at corresponding pins. At reset, all output pins of binary counter 200 are at the "0" state. At the trailing edge of the first clock cycle, pin 1185 changes to a "1" state. At the trailing edge of the second clock cycle, pin 1 returns to the "0" state and pin 2 moves to the "1" state. At the trailing edge of the third cycle, pin 2 remains at the "1" state and pin 1 moves to the "1" state. At the trailing edge of the fourth cycle, pins 1 and 2 return to the "0" state and pin 3 moves to the "1" state.

Pin 1 provides the input signal divided by two to the first power or one-half of the input signal. Pin 3 provides the input signal divided by two to the third power or one-eighth of the input signal. The associated value of each pin is shown in parenthesis. These values can be used to calculate which bit is currently being counted. For example, after the input reaches the seventh bit, only pins 1, 2, and 3 are all at "1" and the sum of their associated values is 7 (1+2+4=7). After the 19th bit, only pins 1, 2, and 5 are at "1" and their values add up to 19 (1+2+16=19). After bit 30, the sum is 30 (2+4+8+16=30). In this way, signals can be generated which designate a specific bit in the count of primary reference clock signal 115. When the reset is triggered by a pulse, binary counter 200 starts the count over again at bit 1.

Figure 4:
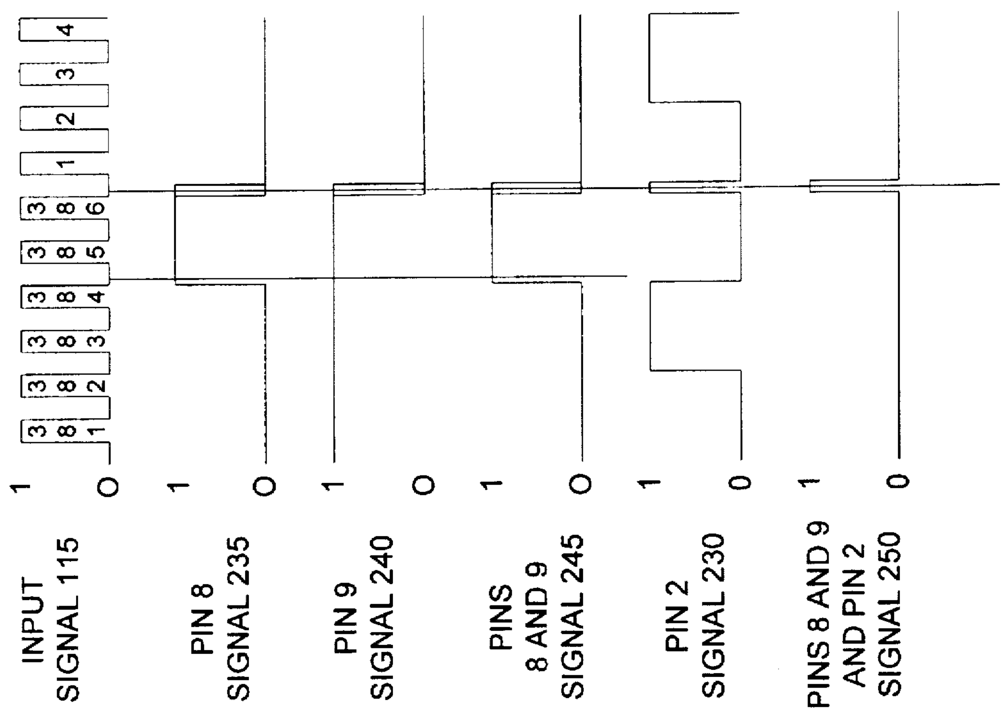
FIG. 4 shows a timing diagram of a version of the invention.

FIG. 2 shows that signals 235 and 240 from pins 8 and 9 are provided to gate 205. Signal 245 from gate 205 and signal 230 from pin 2 are provided to gate 210. FIG. 4 shows these signals. Clock signal 115 is shown at the top starting with bit 381 (after a reset) of clock signal 115. At bit 384, signal 235 from pin 8 goes to "1". Signal 240 from pin 9 went to "1" previously at bit 256 (not shown) and remains at "1". Thus, signal 245 from the output of gate 205 goes to "1" at bit 384. Signal 230 from pin 2 is shown as is the output of gate 210. Signal 250 goes to "1" for the first time at bit 386. Upon reset after bit 386, all signals go to "0".

When, the output of gate 210 moves from "0" to "1", it represents the trailing edge of bit 386 or the end of exactly two DS1 frame times. Signal 250 from gate 210 is fed to multi-vibrator 215. Multi-vibrator 215 is known as a one shot multi-vibrator which accepts an input pulse and provides an output pulse which has a specific duration. Multi-vibrator 215 generates a single output pulse when its input changes from the "0" state to the "1" state.

Signal 255 from multi-vibrator 215 resets binary counter 200 and causes all signals at the pins to drop to "0". Multi-vibrator 215 assures that the output of gate 210 remains at "1" for a set period of time after binary counter 200 has reset. Without multi-vibrator 215, signal 255 could drop to "0" immediately upon reset (which it caused) and appear like a transient to other devices instead of a pulse. The pulse duration of signal 255 should be at least a portion of the pulse time of the input to binary counter 200. The pulse duration must be long enough to assure a reliable signal 255 and short enough to assure that binary counter is able to count the next bit of signal 115. A pulse width of 0.25 times the duration of clock signal 115 would accomplish this. If one fourth of a pulse time is selected, the duration would be 1.619 microseconds. (1/1,544,000/4) Those skilled in the art are familiar with multi-vibrators and would appreciate how to set the pulse duration of signal 255.

In addition, signals 240 and 245 are fed to multi-vibrators 220 and 225 respectively. These multi-vibrators are of the same type and accomplish the same function as described above. Respectively, they output signals 260 and 265.

Signals 255, 260, and 265 comprise reference signals 125 of FIG. 1, and would be provided to each timing performance monitor. From the above discussion, it can be seen that reference signal generator 120 counts the bits of clock signal 115 and provides signals as follows:

Bit 256—signal 235.

Bit 384—signals 240 and 260.

Bit 386—signals 250 and 255.

Signal 255 resets binary counter 200 after bit 386 which re-generates the reference signals at bits 256, 384, and 386 after each reset. Since clock signal 115 is at 1,544,000 bits per second, and binary counter 200 resets every 386 bits, binary counter 200 resets exactly 4,000 times per second (1,544,000/386=4,000). This means that the reference signals are re-generated at a frequency of 4000 Hz, and the cycle of the reference signals is 0.25 milliseconds (1/4000). SONET frames are transmitted at a rate of 8000 frames per second, or one frame is transmitted every 0.125 milliseconds. This means at least one complete SONET frame, including bytes A1 and A2, must be transmitted within any given 0.25 millisecond cycle of the reference signals. Timing performance monitor 130 uses the reference signals to count the number of bits in STS-1 signal 100. The count starts when signal 255 goes to "1" and ends when framing bits A1 and A2 are detected.

FIG. 2 shows that timing performance monitor 130 is comprised of SONET recovery clock 270, SONET frame detector 275, AND gate 280, R/S Latch 285, binary counter 290, and binary latch 295. STS-1 100 is provided to both SONET clock recovery 270 and SONET frame detector 275. SONET clock recovery 270 recovers bits from STS-1 signal 100 and provides this as signal 300 to gate 280. SONET frame detector 275 detects the A1 and A2 framing bytes and provides signal 305 to R of R/S latch 285. Signal 305 goes to "1" when the framing bytes are detected. R/S latch 285 provides a constant "1" at Q when a "1" is received at S (latch set). Q is dropped to "0" when a "1" is received at R (latch reset). Q provides signal 310 to gate 280. Gate 280 also receives signal 300 from SONET clock recovery 270. As long as signal 310 is at "1", gate 280 passes the bits from signal 300 to binary counter 290 over signal 315.

When the framing bytes are detected, signal 305, signal 310, and signal 315 all drop to "0". When signal 255 sets R/S latch 285, signal 310 goes to "1" and gate 280 starts to pass STS-1 bits to binary counter 290. When SONET frame detector 275 detects A1 and A2, it resets R/S latch 285 and gate 280 does not pass any more STS-1 bits to binary counter 290. In this way, binary counter 290 can count the bits between signal 255 going to "1" and the detection of the STS-1 framing bytes.

Binary counter 290 is an integrated circuit. Because, the STS-1 frame contains 6,480 bits, binary counter 290 would need to count that high. Signal 265 resets binary counter 290 at the 384 bit of the clock signal 115 count. Signal 255 which occurs two bits later resets binary counter 200 and sets R/S latch 285. This allows binary counter 290 to make its count every two frames, or 4,000 times a second. Binary latch 295 accepts the counts from binary counter 290 over signal 320. Signal 260 (at bit 256 of the clock signal 115 count) causes binary latch 295 to lock the measurements into an output buffer. CPU 150 would then read the output buffer over timing information signal 145. CPU 150 might include a Centronics LPT-1 parallel I/O port to read the information.

From the above discussion, the following sequence can be seen:

(Assume that R/S latch 285 is initially set)

1. Binary counter 200 counts clock signal 115 bits and binary counter 290 counts STS signal 100 bits.
2. Binary counter 290 provides the count to binary latch 295 over signal 320.
3. Before bit 194 of clock signal 115, SONET frame detector 275 detects bytes A1 and A2 in STS-1 signal 100 and resets R/S latch 285 over signal 305, dropping signal 310 to "0".
4. Gate 280 drops signal 315 to "0" ending the count of binary counter 290.
5. At bit 256 of clock signal 115, signal 260 causes binary latch 295 to lock the count to its output buffer and CPU 150 reads the count.
6. At bit 384 of clock signal 115, signal 265 resets binary counter 290.
7. At bit 386 of clock signal 115, signal 255 resets binary counter 200 and sets R/S latch 285.
8. The sequence returns to step number 1 above.

The invention provides a system to monitor the timing performance of SONET signals. A CPU processes the timing performance information and could convert it to a TL-1 format for integration with network management systems. The timing information indicates the difference in bits, between the detection of the framing bytes and a given time reference. If the framing bits for a given STS-1 are constantly appearing at the same bit after the time reference, then the timing of the STS-1 appears stable, but if the number changes by a few bits, that indicates that the frame rate is experiencing a delay. If all STS-1 signals show an equal change, it may mean that the reference clock itself is inaccurate. CPU 150 would be programmed to monitor these bit counts over given time periods, such as 30 days, and generate alarms if pre-determined changes are detected. CPU 150 could provide standard Time Interval Error graphs depicting the timing information.

In the example given in the background section, three local carrier signals are received and transmitted by a single long distance carrier. The long distance carrier was interested in detecting any wander and jitter in the local carrier signals. Using the invention, these local carrier signals could be monitored for timing performance. Representative bits from each signal would be counted starting at a common time reference and lasting until each signal's A1 and A2 bytes were detected. The counts would be repeated for every other frame of each signal. A CPU would collect and process the data, producing graphs and alarms based on predetermined conditions. For example, the CPU could be programmed to provide an alarm whenever the bit count for a signal increased by 4 bits. Thus, the invention would provide an indication that the SONET signals were losing synchronization and enable the network to take preventive measures—before SONET pointer adjustments were needed.

Those skilled in the art are familiar with the components shown on FIG. 2 and the types of connections suitable for this circuitry. Those skilled in the art will also appreciate how a CPU can be configured and programmed in accord with the invention. Those skilled in the art will also appreciate variations in the components, configurations, and circuitry which would support the requirements of the invention. As such, the scope of the invention should not be restricted to any specific embodiment, but only by the following claims.

What is claimed is:

1. A system for measuring the synchronization of a SONET signal comprising:

a SONET interface operable to receive the SONET signal and to detect framing bytes in the SONET signal;

a generator means for generating a start signal and a reset signal at a predetermined frequency and based on a precision timing reference; and a counting means coupled to the generator means and to the SONET interface for counting a number of bits in the SONET signal after each start signal is generated and until the SONET framing bytes are detected, and for resetting the number of bits counted after each reset signal is generated to obtain bit counts.

2. The system of claim 1 wherein the precision timing reference is a 1,544,000 bits per second signal.

3. The system of claim 1 wherein the pre-determined frequency is 4,000 Hz.

4. The system of claim 1 wherein the SONET signal is an STS-1 signal.

5. The system of claim 1 wherein the generator means and the counting means each comprise a binary counter integrated circuit.

6. The system of claim 1 further comprising:

a central processing unit (CPU) configured to detect variations in the bit counts representative of frame rate variations in the SONET signal; and an output means coupled to the counting means for providing the bit counts to the CPU.

7. The system of claim 6 wherein the CPU is further configured to generate an alarm when a particular variation in the bit counts reaches a predetermined number of bits.

8. A system for measuring the synchronization of a plurality of SONET signals comprising:

a plurality of SONET interfaces each operable to receive one of the SONET signals and to detect the framing bytes in that SONET signal;

a generator means for generating a start signal and a reset signal at a predetermined frequency and based on a precision timing reference; and a plurality of counting means wherein each counting means is coupled to the generator means and to one of the SONET interfaces and wherein each counting means is for counting the number of bits in the SONET signal received by the coupled SONET interface to obtain bit counts, wherein the bit counts start after each start signal is generated and end when the SONET framing bytes are detected, and for resetting the bit counts after each reset signal is generated.

9. The system of claim 8 wherein the precision timing reference is a 1,544,000 bits per second signal.

10. The system of claim 8 wherein the pre-determined frequency is 4,000 Hz.

11. The system of claim 8 wherein the plurality of SONET signals are STS-1 signals.

12. The system of claim 8 wherein the generator means and each counting means comprise a binary counter integrated circuit.

13. The system of claim 8 further comprising:

a central processing unit (CPU) configured to detect variations in the bit counts representative of variations in SONET signal frame rates; and a plurality of output means each coupled to one of the counting means and each for providing the bit counts to the CPU.

14. The system of claim 13 wherein the CPU is further configured to detect variations in the generator means based on uniform variations in a plurality of the bit counts.

15. The system of claim 13 wherein the CPU is further configured to generate an alarm when a particular variation in the bit counts reaches a pre-determined number of bits.

16. A method for measuring the synchronization of a SONET signal comprising:

receiving the SONET signal;

generating a start signal and a reset signal at a predetermined frequency and based on a precision timing reference;

detecting the framing bytes in the SONET signal;

counting the number of bits in the SONET signal after the start signal is generated and until the SONET framing bytes are detected to obtain a bit count; and resetting the bit count after each reset signal is generated.

17. The method of claim 16 wherein generating the start signal and the reset signal based on the precision timing reference comprises basing the start signal and the reset signal on a 1,544,000 bit per second signal.

18. The method of claim 16 wherein generating the start signal and a reset signal at the pre-determined frequency comprises generating the start signal and the reset signal at 4,000 Hz.

19. The method of claim 16 wherein receiving the SONET signal comprises receiving an STS-1 signal.

20. The method of claim 16 further comprising:

providing the bit count to a central processing unit (CPU); and detecting, in the CPU, variations in the bit count representative of frame rate variations in the SONET signal.

21. The method of claim 20 further comprising generating an alarm in the CPU when a particular variation in the bit count reaches a predetermined number of bits.

* * * * *